United States Patent
Lim et al.

(10) Patent No.: US 9,847,545 B2
(45) Date of Patent: Dec. 19, 2017

(54) HIGHLY IONIC CONDUCTIVE ZIRCONIA ELECTROLYTE FOR HIGH-EFFICIENCY SOLID OXIDE FUEL CELL

(71) Applicant: KCERACELL CO., LTD., Chungcheongnam-do (KR)

(72) Inventors: Kyoung Tae Lim, Daejeon (KR); Hee Lak Lee, Daejeon (KR); Hyeong Cheol Shin, Daejeon (KR); Choong Hwan Lee, Daejeon (KR); Byung Sub Kim, Daejeon (KR)

(73) Assignee: KCERACELL CO., LTD., Daejeon (KR)

(*) Notice: Subject to any disclaimer, the term of this patent is extended or adjusted under 35 U.S.C. 154(b) by 634 days.

(21) Appl. No.: 14/639,082

(22) Filed: Mar. 4, 2015

(65) Prior Publication Data

US 2015/0255821 A1   Sep. 10, 2015

(30) Foreign Application Priority Data

Mar. 6, 2014   (KR) .................. 10-2014-0026527
Jan. 5, 2015   (KR) .................. 10-2015-0000412

(51) Int. Cl.
| | |
|---|---|
| *H01M 8/12* | (2016.01) |
| *H01M 8/1253* | (2016.01) |
| *H01M 8/126* | (2016.01) |
| *H01M 8/124* | (2016.01) |

(52) U.S. Cl.
CPC ......... *H01M 8/1253* (2013.01); *H01M 8/126* (2013.01); *H01M 2008/1293* (2013.01); *H01M 2300/0077* (2013.01); *Y02E 60/525* (2013.01); *Y02P 70/56* (2015.11)

(58) Field of Classification Search
CPC .... H01M 8/124; H01M 8/126; H01M 8/1253; H01M 2008/1293; H01M 2300/0077; Y02E 60/525; Y02P 70/56
See application file for complete search history.

(56) References Cited

U.S. PATENT DOCUMENTS

| | | | |
|---|---|---|---|
| 2011/0183233 A1* | 7/2011 | Armstrong ............ | C04B 35/486 429/482 |
| 2013/0316264 A1* | 11/2013 | Liu ..................... | H01M 8/1016 429/482 |
| 2014/0023951 A1* | 1/2014 | Suzuki ................ | H01M 4/9066 429/465 |

FOREIGN PATENT DOCUMENTS

| | | |
|---|---|---|
| JP | 2008-305804 A | 12/2008 |
| KR | 10-1186766 B1 | 9/2012 |
| KR | 10-2012-0137917 A | 12/2012 |

* cited by examiner

*Primary Examiner* — Brittany Raymond
(74) *Attorney, Agent, or Firm* — Rabin & Berdo, P.C.

(57) ABSTRACT

Disclosed are a highly ionic conductive zirconia electrolyte and a high-efficiency solid oxide fuel cell using the same. The highly ionic conductive zirconia electrolyte is configured such that a scandia ($Sc_2O_3$) stabilized zirconia ($ZrO_2$) electrolyte is simultaneously doped with cerium oxide ($CeO_2$) and at least one oxide of gadolinium oxide ($Gd_2O_3$), samarium oxide ($Sm_2O_3$), and ytterbium oxide ($Yb_2O_3$) so that an ionic conductivity drop rate is mitigated.

8 Claims, 9 Drawing Sheets

HIGHLY IONIC CONDUCTIVE ZIRCONIA ELECTROLYTE FOR HIGH-EFFICIENCY SOLID OXIDE FUEL CELL

BACKGROUND OF THE INVENTION

1. Field of the Invention

The present invention relates to a solid electrolyte, which is used as a key component in a solid oxide fuel cell (SOFC). More particularly, the present invention relates to a highly ionic conductive zirconia electrolyte, which includes a multicomponent rare earth oxide stabilizer so that an ionic conductivity drop rate may be mitigated, and to a unit cell for a high-efficiency SOFC using the same.

2. Description of the Related Art

A SOFC, which includes as a core part, a ceramic unit cell comprising ceramic electrodes and an electrolyte, may operate at the highest temperature among various fuel cells. Furthermore, a SOFC exhibits high energy conversion efficiency and is able to operate a gas turbine or a micro gas turbine in two steps using hot steam discharged via high-temperature operation, thereby enabling construction of a high-efficiency combined cycle power generation system. In addition, a SOFC is advantageous because of high fuel selectivity, and thus can employ any hydrocarbon-based fuel, as well as hydrogen fuel gas. Hence, the U.S. Department of Energy (DOE) is sponsoring the research of MW class integrated gasification fuel cell (IGFC) technology.

Figure 1:
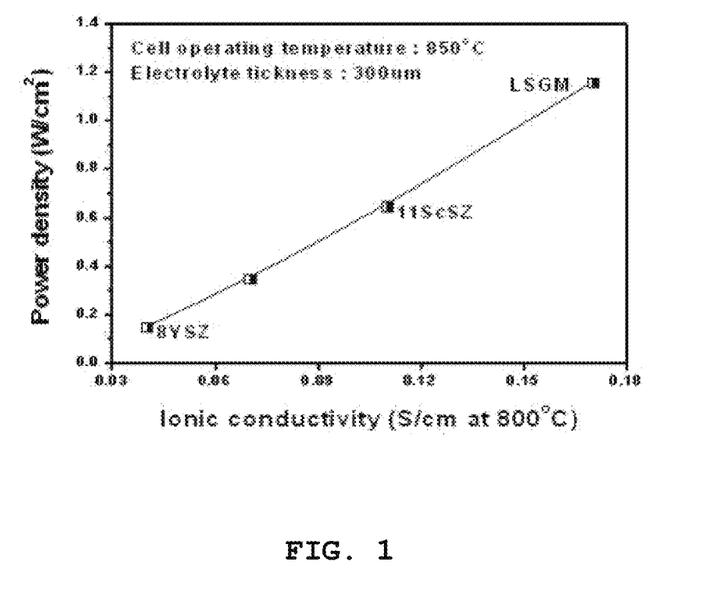
FIG. 1 is a graph illustrating the power density of unit cells depending on the kind of electrolyte and the ionic conductivity thereof.

FIG. 1 is a graph illustrating the power density of unit cells depending on the kind and ionic conductivity of the electrolyte used therein. When a SOFC operates at the same temperature, output characteristics of the SOFC, namely, power density (W/cm$^2$), may be closely related with the ionic conductivity of the electrolyte. Also, when the same electrolyte is used, the ionic conductivity of the electrolyte is increased exponentially in proportion to an increase in the operating temperature, ultimately enhancing the power density of the SOFC. However, an increase in the operating temperature may deteriorate high-temperature stability and long-term durability of a SOFC.

A conventional zirconia electrolyte (8YSZ electrolyte) retains ionic conductivity as high as about 0.04 S/cm at an operating temperature of 800° C. However, when the operating temperature is lower, ionic conductivity may drastically drop, and thus limitations are imposed on applying such an electrolyte to medium/low temperature operating SOFCs.

For this reason, in developed countries that are leading the commercialization of SOFC technology, the development of novel electrolyte materials having high oxygen ionic conductivity even at medium/low operating temperatures has emerged as an important research area. However, newly developed alternative electrolyte materials may have their own inherent drawbacks, and thus continuous material improvement is required.

Meanwhile, a zirconia-based electrolyte has ionic conductivity varying depending on the kind and amount of stabilizer and the ionic radius of stabilizer. In particular, as a size difference between the radius of zirconium ion ($Zr^{4+}$) as a main lattice material and the cation radius of rare earth (Re) oxide as a stabilizer is smaller, the oxygen ionic conductivity of the electrolyte may increase. Hence, scandia ($Sc_2O_3$) stabilized zirconia exhibits the highest ionic conductivity. Especially, 11 mol % scandia stabilized zirconia (hereinafter, abbreviated to "11ScSZ") does not drop in ionic conductivity even after long-term use and is thus regarded as an ideal electrolyte material. However, the 11ScSZ electrolyte is disadvantageous in terms of phase transition to a monoclinic structure at a temperature lower than about 630° C. and to a cubic structure in the higher temperature range.

With the goal of solving such phase transition problems, thorough research and development has been carried out. Specifically, Toho Gas, Japan has developed and commercialized a novel electrolyte in which a portion of any component of 11ScSZ electrolyte is substituted with ceria ($CeO_2$) and thus which is stabilized into a cubic structure in the temperature range from room temperature to high temperature. As disclosed in JP 2008-305804 A by Toho Gas, the electrolyte composition is composed of 8.5~15 mol % of scandia and 0.5~2.5 mol % of yttria and/or ceria under the condition that the total amount of scandia and yttria and/or ceria is formulated to 9~15 mol %. A commercially available electrolyte product is 10Sc1CeSZ (10 mol % $Sc_2O_3$-1 mol % $CeO_2$-89 mol % $ZrO_2$).

The 10Sc1CeSZ electrolyte has no known phase transition problems, but new drawbacks may appear. Specifically, a unit cell using the 10Sc1CeSZ electrolyte is continuously decreased in power density (W/cm$^2$) with operating time.

The cause of such problems, which has not been clarified to date, is ascertained by Kceracell Co. Ltd to be due to newly introduced $CeO_2$. The 10Sc1CeSZ electrolyte is present as a white sintered body after sintering at 1400° C. or more, and maintains the same color even when exposed to air. However, in the case where this electrolyte is exposed to a reducing atmosphere including hydrogen, it is discolored to red. As a typical ceria-based electrolyte for SOFCs, $Gd_{0.1}Ce_{0.9}O_{1.95}$ exhibits the same discoloration. The ceria-based electrolytes show high oxygen ionic conductivity compared to the 11ScSZ electrolyte, but are problematic because $Ce^{4+}$ is reduced to $Ce^{3+}$ upon exposure to a reducing atmosphere (hydrogen fuel gas atmosphere) at a temperature equal to or higher than 650° C. Hence, such characteristics make it difficult to utilize such electrolytes as actual electrolytes that are simultaneously exposed to air (oxidation atmosphere) and fuel (reducing atmosphere) gas.

Consequently, instability of the 10Sc1CeSZ electrolyte in a reducing atmosphere is considered to cause a continuous decrease in power of the unit cell. Hence, there is a need for technical development for providing a novel zirconia electrolyte in the art where scandia stabilized zirconia is stabilized into a cubic crystal structure and also which is improved in stability in a reducing atmosphere.

CITATION LIST

Patent Literature

Patent Document 1: Korean Patent Application Publication No. 10-2012-0137917
Patent Document 2: Korean Patent No. 10-1186766
Patent Document 3: Japanese Patent Application Publication No. 2008-305804

SUMMARY OF THE INVENTION

Accordingly, the present invention has been made keeping in mind the problems encountered in the art, and an object of the present invention is to provide a highly ionic conductive zirconia electrolyte, in which the crystal structure of scandia stabilized zirconia is stabilized into a cubic crystal structure while maintaining the intrinsically high oxygen ionic conductivity of a conventional scandia stabilized zirconia electrolyte (11ScSZ), thus solving phase transition problems, and mitigating an oxygen ionic conductivity drop rate to thereby ensure stability in a reducing atmosphere.

In order to accomplish the above object, the present invention provides a highly ionic conductive zirconia electrolyte, which is configured such that a scandia ($Sc_2O_3$) stabilized zirconia ($ZrO_2$) electrolyte is simultaneously doped with cerium oxide ($CeO_2$) and at least one oxide selected from among gadolinium oxide ($Gd_2O_3$), samarium oxide ($Sm_2O_3$), and ytterbium oxide ($Yb_2O_3$) so that an ionic conductivity drop rate is mitigated.

In an embodiment of the present invention, the electrolyte may have a composition of Chemical Formula 1 below:

[Chemical Formula 1]

0.08≤x≤0.11
0.005≤y+z≤0.02
$Re_2O_3$ comprises at least one selected from among $Gd_2O_3$, $Sm_2O_3$, and $Yb_2O_3$.

In an embodiment of the present invention, the zirconia electrolyte may have a composition of Chemical Formula 1 in which a ratio of y to z is 1:3~3:1.

In an embodiment of the present invention, the zirconia electrolyte may have a composition of Chemical Formula 1 in which $Re_2O_3$ is gadolinium oxide ($Gd_2O_3$), and a ratio of y to z is 1:1~3:1.

In addition, the present invention provides a highly ionic conductive zirconia electrolyte sintered body having a sintering density of 95% or more, obtained by molding and sintering the highly ionic conductive zirconia electrolyte in powder form.

In addition, the present invention provides a unit cell for a SOFC, comprising: the highly ionic conductive zirconia electrolyte sintered body as above; and a cathode and an anode formed at both sides of the highly ionic conductive zirconia electrolyte sintered body.

In an embodiment of the present invention, the unit cell may have a planer-type, tubular-type, or flat-tube type structure.

Also, the unit cell may be an electrolyte supported cell (ESC), an anode supported cell (ASC), a cathode supported cell (CSC), or a segment-type cell.

In an embodiment of the present invention, in order to maximize an electrochemical reaction at the cathode, a ceria ($CeO_2$) solid electrolyte in which either Sm or Gd is doped may be provided as a dense film or a porous layer between an electrolyte membrane and the cathode, and a powder applied to the cathode may include any one mixed ionic and electronic conductor (MIEC) of $Ln_{1-x}Sr_xCo_{1-y}Fe_yO_3$ (Ln is any one selected from among La, Ba, Pr, and Sm, 0.3≤x≤0.5, 0.5≤y≤0.9), $Ln_{1-x}Sr_xM_xO_3$ (Ln is any one selected from among La, Ba, Pr, and Sm, M is any one selected from among Co, Fe, Ni, and Mn, 0.3≤x≤0.5), $LaNi_{1-x}M_xO_3$ (M is any one selected from among Fe and Co, 0.3≤x≤0.5), $Ln_{2-x}Sr_xNi_{1-y}M_yO_4$ (Ln is any one selected from among La, Pr, Nd, and Sm, M is any one selected from among Fe, Co, and Mn, 0.2≤x≤1, 0.05≤y≤0.5), and $LnMCo_2O_5$ (Ln is any one selected from among Gd, Sm, and Nd, and M is any one selected from among Ba, Sr, and Ca).

In another embodiment of the present invention, the powder applied to the cathode may be a mixture comprising any one cathode powder of $La_{1-x}Sr_xMO_3$ (0.2≤x≤0.4, M is any one selected from among Mn, Fe, and Co), $Ln_{1-x}Sr_xCo_{1-y}Fe_yO_3$ (0.2≤x≤0.5, 0.2≤y≤0.8, Ln is any one selected from among La, Pr, and Ba), and $LaNi_{1-x}M_xO_3$ (0.3≤x≤0.5, M is any one selected from among Fe, Co, and Cu), and a ScSZ-based electrolyte powder or a $Ce_{1-x}Ln_xO_2$ (0.1≤x≤0.3, Ln is any one selected from among Gd, Sm, and Y) electrolyte powder.

In an embodiment of the present invention, a powder applied to the anode may comprise a composite of nickel oxide and a ScSZ-based or $Ce_{1-x}Ln_xO_2$ (0.1≤x≤0.3, Ln is any one selected from among Gd, Sm, and Y) electrolyte powder, which are mixed together, and the nickel oxide may be used in an amount of 50~60 wt %.

In addition, the present invention provides a method of synthesizing the highly ionic conductive zirconia electrolyte, using any one process selected from among: a coprecipitation process wherein an aqueous solution obtained by dissolving an aqueous metal chloride, metal nitrate, metal sulfate, metal acetate, and metal oxide for Sc, Ce, Gd, Sm, Yb, and Zr in nitric acid, hydrochloric acid or sulfuric acid, is coprecipitated into a metal hydroxide using any one precipitation reagent selected from among ammonium hydroxide ($NH_4OH$), sodium hydroxide (NaOH), potassium hydroxide (KOH), and urea ($CO(NH_2)_2$), and then calcined; a hydrothermal synthesis process wherein materials as in the coprecipitation process are crystallized at high temperature and high pressure in a closed reactor; a combustion synthesis process wherein metal salts as in the coprecipitation process are mixed with an organic material including glycine and/or citric acid, and directly combusted without precipitation; and a spray combustion synthesis process wherein metal salts as in the coprecipitation process are added with an organic material, thus obtaining an aqueous solution, which is then sprayed using a reactor at high temperature.

In addition, the present invention provides a method of manufacturing a highly ionic conductive zirconia electrolyte, which comprises: 1) weighing starting materials, comprising Sc chloride, Gd chloride, Sm chloride, Yb chloride, Ce chloride, and Zr oxychloride, so as to be adapted for a preset composition, and performing dissolution in pure water and stirring for 2 hr using a stirrer, thus preparing a uniform solution; 2) adding the mixed metal salt with ammonium hydroxide as a precipitation reagent at a rate of 250 ml/min with stirring until pH thereof is 10; 3) performing precipitation for 5 hr so that metal hydroxide formed by the addition of ammonium hydroxide is sufficiently settled, and performing washing five times with pure water and centrifugation using a centrifuge, thus separating a precipitate; and 4) washing the coprecipitated metal hydroxide using ethanol, drying it at 110° C., and calcining the dried metal hydroxide at 970° C. for 2 hr so as to be crystallized and made into a metal oxide.

In an embodiment of the present invention, the concentration of the aqueous solution may be adjusted so that the total metal salt concentration in Step 1) is 0.25 M.

In an embodiment of the present invention, the method of manufacturing the highly ionic conductive zirconia electrolyte may further comprise, after Step 4): 5) milling and dispersing the thermally treated electrolyte powder for 5 hr in the presence of a water solvent using a vertical bead mill with zirconia balls having a diameter of 0.5 mm; 6) drying the milled slurry at 110° C., thus synthesizing a final electrolyte powder; and 7) subjecting the electrolyte powder synthesized by a coprecipitation process and the 10Sc1CeSZ electrolyte powder to uniaxial pressure molding, thus producing a disk-shaped molded body having a diameter of 27 mm, which is then sintered at 1450° C. for 5 hr.

According to the present invention, a highly ionic conductive zirconia electrolyte can be stabilized into not a monoclinic crystal structure but a cubic crystal structure at room temperature because cerium oxide ($CeO_2$) and at least one oxide of gadolinium oxide ($Gd_2O_3$), samarium oxide ($Sm_2O_3$) and ytterbium oxide ($Yb_2O_3$) are simultaneously doped.

Compared to a conventional 10Sc1CeSZ electrolyte, the zirconia electrolyte of the invention can decrease a conductivity drop rate in a reducing atmosphere, thus solving phase transition problems and instability problems in a reducing atmosphere. Therefore, such a zirconia electrolyte can ensure high oxygen ionic conductivity, phase stability, and stability in a reducing atmosphere.

The zirconia electrolyte includes a multicomponent Re oxide stabilizer, and can thus improve high-temperature stability and durability of a SOFC at an operating temperature of 750° C. or less.

The aforementioned effects are set forth to illustrate, but are not to be construed as limiting the scope of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of preferred embodiments of the present invention with reference to the appended drawings. The embodiments of the present invention are provided to more fully describe the technical spirit of the present invention to those skilled in the art, and may be modified in various ways and are not construed as limiting the present invention. Rather, these embodiments are provided to complete the present disclosure and to fully deliver the technical spirit of the present invention to those skilled in the art. As used herein, the term "and/or" may include any one of the listed items and any combination of one or more thereof. Throughout the drawings, the same reference numerals refer to the same or like parts. Furthermore, various parts and areas in the drawings are schematically depicted. Hence, the technical spirit of the present invention is not limited by the relative sizes or intervals shown in the drawings.

According to the present invention, a highly ionic conductive zirconia electrolyte is configured such that a scandia ($Sc_2O_3$) stabilized zirconia ($ZrO_2$) electrolyte is simultaneously doped with cerium oxide ($CeO_2$) and at least one oxide of gadolinium oxide ($Gd_2O_3$), samarium oxide ($Sm_2O_3$) and ytterbium oxide ($Yb_2O_3$) so that an ionic conductivity drop rate may be mitigated.

Figure 2:
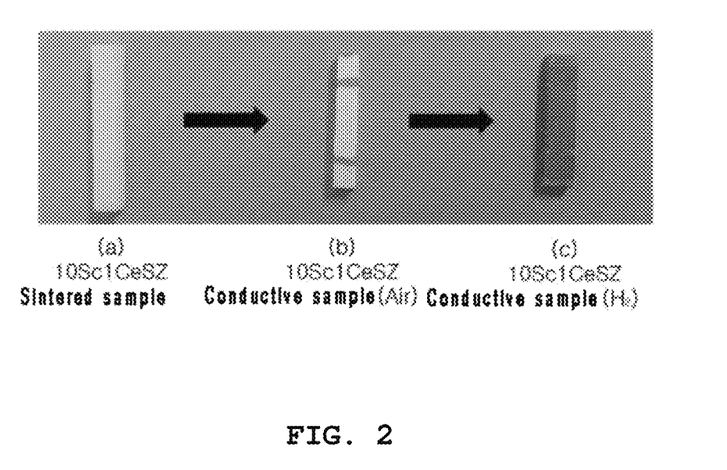
FIG. 2 illustrates a first sintered 10Sc1CeSZ electrolyte and electrolyte samples exposed to air and hydrogen gas.

Typically, a unit cell using a 10Sc1CeSZ electrolyte is continuously decreased in power density ($W/cm^2$) with operating time. FIG. 2 illustrates the first sintered 10Sc1CeSZ electrolyte and the electrolyte samples exposed to air and hydrogen gas. Both the first sintered sample and the sample exposed to air show a white color, whereas the electrolyte sample exposed to hydrogen gas is discolored to red.

A typical ceria-based electrolyte $Gd_{0.1}Ce_{0.9}O_{1.95}$ for SOFCs shows the same discoloration, and ceria-based electrolytes exhibit high oxygen ionic conductivity compared to the 11ScSZ electrolyte. However, when such an electrolyte is exposed to a reducing atmosphere (a hydrogen fuel gas atmosphere) at a temperature equal to or higher than 650° C., $Ce^{4+}$ ions are undesirably reduced to $Ce^{3+}$ ions. Thus, a continuous decrease in the power of the unit cell is considered to be due to instability of the 10Sc1CeSZ electrolyte in a reducing atmosphere.

A zirconia-based electrolyte (8YSZ electrolyte) has ionic conductivity varying depending on the kind and amount of stabilizer and the ionic radius of stabilizer. In particular, as a difference between the radius of zirconium ion ($Zr^{4+}$ as a main lattice material and the cation radius of Re oxide as a stabilizer is smaller, the oxygen ionic conductivity of the electrolyte may increase.

In order to overcome phase transition problems of the 10Sc1CeSZ electrolyte and to improve stability in a reducing atmosphere, the amount of $CeO_2$ is decreased and $Gd_2O_3$, $Sm_2O_3$, and $Yb_2O_3$ having a cation radius similar to the cation ($Ce^{4+}$) radius of $CeO_2$ may be doped, thus mitigating an ionic conductivity drop rate.

When $CeO_2$ content is decreased, phase transition may be prevented, and the conductivity drop rate in a reducing atmosphere may be mitigated two-fold. As the stability in a reducing atmosphere is improved, the degradation of a SOFC and the power thereof may be lowered.

Also, the highly ionic conductive zirconia electrolyte may have a composition of Chemical Formula 1 below.

[Chemical Formula 1]

$0.08 \leq x \leq 0.11$
$0.005 \leq y+z \leq 0.02$
$Re_2O_3$ comprises at least one selected from among $Gd_2O_3$, $Sm_2O_3$, and $Yb_2O_3$.

In the zirconia electrolyte, scandium oxide ($Sc_2O_3$) is doped in an amount of 8~11 mol %, and cerium oxide ($CeO_2$) and at least one trivalent Re oxide of gadolinium ($Gd_2O_3$), samarium oxide ($Sm_2O_3$), and ytterbium oxide ($Yb_2O_3$) are simultaneously doped in amounts of 0.5~2 mol %. Hence, this electrolyte is stabilized into a cubic crystal structure at room temperature, and also, is significantly mitigated in ionic conductivity degradation characteristics in a reducing (hydrogen) atmosphere, which are the major problem of a conventional scandia stabilized zirconia doped with only cerium oxide ($CeO_2$).

The zirconia electrolyte may have a composition of Chemical Formula 1 wherein the ratio of y to z is 1:3~3:1. In all electrolytes where $CeO_2$ is doped using a novel stabilizer ($Re_2O_3$: $Gd_2O_3$, $Sm_2O_3$ and $Yb_2O_3$) and the molar ratio of doped $CeO_2$ and $Re_2O_3$ is set to 3:1~1:3, the ionic conductivity drop rate is decreased, and ionic conductivity degradation characteristics may be significantly mitigated. Also, all the electrolytes where a portion of $CeO_2$ is doped with $Re_2O_3$ show superior ionic conductivity, compared to a 10Sc1ReSZ electrolyte having no $CeO_2$ due to complete doping with $Re_2O_3$, instead of $CeO_2$.

The zirconia electrolyte may have a composition of Chemical Formula 1 in which $Re_2O_3$ is gadolinium oxide ($Gd_2O_3$) and the ratio of y to z is 1:1~3:1. The electrolyte using gadolinium oxide ($Gd_2O_3$) is evaluated to be very stable in a reducing atmosphere. Based on the results of evaluation of a novel electrolyte using $Gd_2O_3$ and a conventional 10Sc1CeSZ electrolyte in terms of ionic conductivity drop rate in a hydrogen atmosphere with operating time, the ionic conductivity drop rate of the novel electrolyte using $Gd_2O_3$ is lowered to ⅓ of that of the 10Sc1CeSZ electrolyte. In particular, for the 10Sc1CeSZ electrolyte where $CeO_2$ and $Gd_2O_3$ are doped at a molar ratio of 1:1~3:1, superior ionic conductivity may result, compared to the 10Sc1CeSZ electrolyte.

In addition, the present invention addresses a highly ionic conductive zirconia electrolyte sintered body, which has a sintering density of 95% or more by molding and sintering the highly ionic conductive zirconia electrolyte powder. The solid electrolyte for a SOFC has to have requirements of: 1) high oxygen ionic conductivity (a pure ionic conductor having ignorable electronic conductivity), 2) high mechanical strength, 3) a uniform crystal structure and coefficient of thermal expansion in the temperature range from room temperature to operating temperature, 4) stability in an oxidation atmosphere and a reducing atmosphere (electrolyte stability in a wide oxygen partial pressure range), and 5) high sintering density of 95% or more at a sintering temperature of a unit cell for a SOFC. As such, diffusion of oxygen ions may become efficient and air and fuel gas do not permeate only when a sintering density of 95% or more is ensured at a sintering temperature.

In addition, the present invention addresses a unit cell for a SOFC, comprising the highly ionic conductive zirconia electrolyte sintered body and a cathode and an anode formed at both sides thereof. Since a porous cathode and anode are attached to both ends of the electrolyte for a SOFC, the electrolyte membrane having a sintering density of 95% or more is actually exposed to both of air and hydrogen fuel gas. Hence, the electrolyte should be stable in atmospheres of both air and fuel gas. Most of electrolyte materials or electrode materials show good phase stability or conductivity characteristics in an air atmosphere, but phase stability and conductivity characteristics may deteriorate in a fuel gas atmosphere.

The unit cell may have a planer-type, tubular-type or flat-tube type structure, and the electrolyte of the invention may be applied to any type of unit cell, including an electrolyte supported cell (ESC), an anode supported cell (ASC), a cathode supported cell (CSC), or a segment-type cell.

A tubular-type unit cell is advantageous because of easy gas sealing and superior mechanical properties of the structure itself, thus enabling the fabrication of tens~ hundreds of kW class large stacks. However, this unit cell is problematic in terms of low power density per unit volume. Although a planer-type unit cell has high power density per unit volume, it has drawbacks such as stack sealing, high interactions of individual components, and poor mechanical stability. This unit cell may be applied to auxiliary power units (APUs) requiring high power density for 1 kW or less class household products, 10 kW or more class buildings, and ones of kW class carriers. A tubular-type unit cell may be applied to an anode support type, a cathode support type, and a segment type, and a planer-type unit cell may be manufactured in the form of an anode support type, an electrolyte support type, or a metal support type. A flat-tube type unit cell may be currently applied to household products based on an anode support type, or to power generation systems in the form of a segment type.

A cathode material may include a mixed conductive cathode material such as LSCF (Sr & Co doped $LaFeO_3$), or a uniform mixture of LSM (Sr doped $LaMnO_3$) and ScSZ-based electrolyte powder.

In order to maximize the electrochemical reaction at the cathode, the ceria ($CeO_2$) solid electrolyte including doped Sm or Gd is provided in the form of a dense film or a porous layer between the electrolyte membrane and the cathode. The powder applied to the cathode may include any one mixed ionic and electronic conductor (MIEC) of $Ln_{1-x}Sr_xCo_{1-y}Fe_yO_3$ (Ln is any one selected from among La, Ba, Pr, and Sm, $0.3 \leq x \leq 0.5$, $0.5 \leq y \leq 0.9$), $Ln_{1-x}Sr_xMO_3$ (Ln is any one selected from among La, Ba, Pr, and Sm, M is any one selected from among Co, Fe, Ni, and Mn, $0.3 \leq x \leq 0.5$), $LaNi_{1-x}M_xO_3$ (M is any one selected from among Fe and Co, $0.3 \leq x \leq 0.5$), $Ln_{2-x}Sr_xNi_{1-y}M_yO_4$ (Ln is any one selected from among La, Pr, Nd, and Sm, M is any one selected from among Fe, Co, and Mn, $0.2 \leq x \leq 1$, $0.05 \leq y \leq 0.5$), and $LnMCo_2O_5$ (Ln is any one selected from among Gd, Sm, and Nd, and M is any one selected from among Ba, Sr, and Ca).

The powder applied to the cathode may be a mixture comprising any one cathode powder of $La_{1-x}Sr_xMO_3$ (0.2≤x≤0.4, M is any one selected from among Mn, Fe, and Co), $Ln_{1-x}Sr_xCo_{1-y}Fe_yO_3$ (0.2≤x≤0.5, 0.2≤y≤0.8, Ln is any one selected from among La, Pr, and Ba), and $LaNi_{1-x}M_xO_3$ (0.3≤x≤0.5, M is any one selected from among Fe, Co, and Cu), and a ScSZ-based electrolyte powder or a $Ce_{1-x}Ln_xO_2$ (0.1≤x≤0.3, Ln is any one selected from among Gd, Sm, and Y) electrolyte powder.

The powder applied to the anode may include a composite of nickel oxide (NiO) and a ScSZ-based or $Ce_{1-x}Ln_xO_2$ (0.1≤x≤0.3, Ln is any one selected from among Gd, Sm, and Y) electrolyte powder, which are mixed together, and NiO may be used in an amount of 50~60 wt %.

The amount of NiO of the NiO+ScSZ composite powder applied to the anode is 50~60 wt %. The composite powder for the anode is manufactured in such a manner that the electrolyte powder is mixed with a nickel nitrate aqueous solution, precipitated with any one precipitation reagent of ammonium hydroxide, sodium hydroxide, and potassium hydroxide, washed, calcined, and wet milled, giving NiO+ScSZ composite powder.

According to the present invention, the method of synthesizing the highly ionic conductive zirconia electrolyte may be performed using any one selected from among a coprecipitation process, a hydrothermal synthesis process, a combustion synthesis process, and a spray combustion synthesis process.

The coprecipitation process is performed in such a manner that an aqueous metal chloride, metal nitrate, metal sulfate, metal acetate, and metal oxide for Sc, Ce, Gd, Sm, Yb, and Zr is dissolved in nitric acid, hydrochloric acid, or sulfuric acid, thus obtaining an aqueous solution, which is then coprecipitated into a metal hydroxide using any one precipitation reagent of ammonium hydroxide ($NH_4OH$), sodium hydroxide (NaOH), potassium hydroxide (KOH), and urea ($CO(NH_2)_2$), and thereafter calcined.

The hydrothermal synthesis process is performed in such a manner that materials as in the coprecipitation process are crystallized under high-temperature and high-pressure conditions in a closed reactor. The combustion synthesis process is performed in such a manner that metal salts as in the coprecipitation process are mixed with an organic material such as glycine and/or citric acid, and then directly combusted without precipitation.

The spray combustion synthesis process is performed in such a manner that metal salts as in the coprecipitation process are added with an organic material, thus obtaining an aqueous solution, which is then sprayed by means of a reactor at high temperature.

Figure 3:
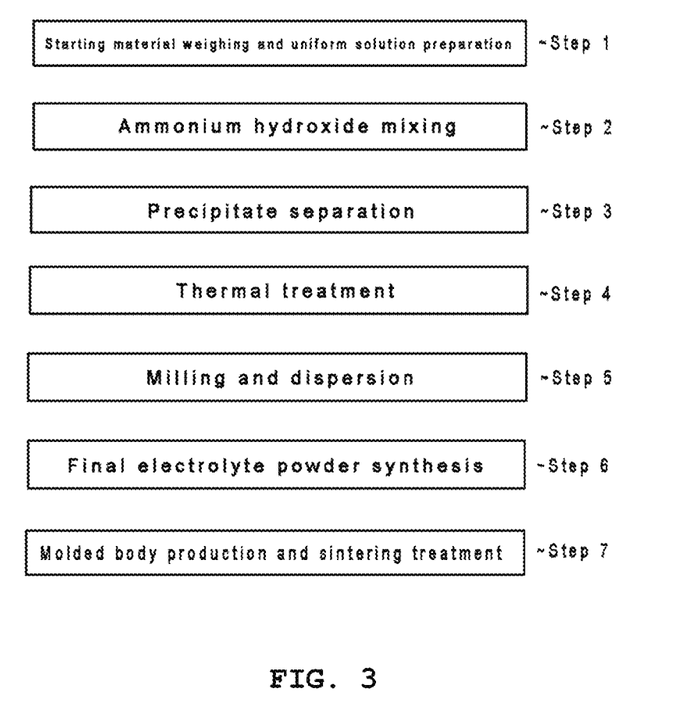
FIG. 3 is a flowchart illustrating a process of manufacturing a highly ionic conductive zirconia electrolyte according to the present invention.

FIG. 3 is a flowchart illustrating a process of manufacturing the highly ionic conductive zirconia electrolyte according to the present invention. As illustrated in FIG. 3, the method of manufacturing the highly ionic conductive zirconia electrolyte according to the present invention includes: 1) weighing staring materials, thus preparing a uniform solution; 2) mixing ammonium hydroxide; 3) separating a precipitate; and 4) performing thermal treatment.

In Step 1), the starting materials, comprising Sc chloride, Gd chloride, Sm chloride, Yb chloride, Ce chloride, and Zr oxychloride, are weighed so as to be adapted for a preset composition, dissolved in pure water, and stirred for 2 hr using a stirrer, giving a uniform solution. In Step 1), the concentration of the aqueous solution may be adjusted so that the total metal salt concentration is 0.25 M. As the concentration of the metal salt is lower, aggregation of the precipitate may decrease, but the yield of final electrolyte powder may decrease. Hence, the concentration of the metal salt is appropriately set to about 0.25 M. In an embodiment of the present invention, a metal chloride is used. Alternatively, a metal nitrate material or a metal oxide dissolved in hydrochloric acid or nitric acid may be used.

In Step 2), the mixed metal salt is added with ammonium hydroxide as a precipitation reagent at a rate of 250 ml/min with stirring until pH of the salt is 10. The addition rate of the precipitation reagent may vary depending on the process time or the yield.

In Step 3), precipitation is performed for 5 hr so that metal hydroxide formed by the addition of ammonium hydroxide is sufficiently settled, and the precipitate is washed five times with pure water, and separated using a centrifuge.

In Step 4), the coprecipitated metal hydroxide is washed with ethanol and dried at 110° C., and the dried metal hydroxide is calcined at 970° C. for 2 hr so as to be crystallized and made into an oxide. The calcination temperature may be variously set in order to control a desired electrolyte particle size. However, an electrolyte powder having high sinterability is mainly calcined at 900~1100° C. To prevent aggregation of the precipitate, final washing is performed using ethanol, and the dried metal hydroxide is calcined so as to be crystallized and made into an oxide having an actually usable particle size.

According to the present invention, the method of manufacturing the highly ionic conductive zirconia electrolyte may further include: 5) performing milling and dispersion; 6) synthesizing a final electrolyte powder; and 7) producing a molded body and performing sintering, after Step 4).

In Step 5), the electrolyte powder thermally treated in Step 4) is milled and dispersed for 5 hr in the presence of a water solvent using a vertical bead mill with zirconia balls having a diameter of 0.5 mm.

In Step 6), the milled slurry is dried at 110° C., thus synthesizing a final electrolyte powder. Step 7) is carried out in such a manner that the electrolyte powder synthesized via coprecipitation and the 10Sc1CeSZ electrolyte powder are produced into a disk-shaped molded body having a diameter of 27 mm using a uniaxial pressure molding process, and then sintered at 1450° C. for 5 hr. The zirconia electrolyte may be synthesized using any one selected from among a hydrothermal synthesis process, a combustion synthesis process, and a spray combustion synthesis process, in addition to the coprecipitation process.

Below is a description of embodiments of the present invention through the following examples and test examples.

TEST EXAMPLE 1

Evaluation of Doping Effect of $CeO_2$ on 11ScSZ Electrolyte 1-1. Formation of Electrolyte Samples In order to evaluate the doping effect of $CeO_2$ on an 11ScSZ electrolyte, electrolyte samples were manufactured in composition designs having the chemical formulas of Tables 1 and 2 below. In this test example, the samples were manufactured into E1 electrolyte groups in which a portion of $Sc_2O_3$ was doped with $CeO_2$ as shown in Table 1, and E2 electrolyte groups in which a portion of $ZrO_2$ was doped with $CeO_2$ as shown in Table 2.

TABLE 1

| Sample | Electrolyte Composition | Chemical Formula |
|---|---|---|
| Comp. E1-1 | 11ScSZ | $(Sc_2O_3)_{0.11}(ZrO_2)_{0.89}$ |
| Comp. E1-2 | 10.5Sc0.5CeSZ | $(Sc_2O_3)_{0.105}(CeO_2)_{0.005}(ZrO_2)_{0.89}$ |
| Comp. E1-3 | 10Sc1CeSZ | $(Sc_2O_3)_{0.1}(CeO_2)_{0.01}(ZrO_2)_{0.89}$ |
| Comp. E1-4 | 9.5Sc1.5CeSZ | $(Sc_2O_3)_{0.095}(CeO_2)_{0.015}(ZrO_2)_{0.89}$ |
| Comp. E1-5 | 9Sc2CeSZ | $(Sc_2O_3)_{0.09}(CeO_2)_{0.02}(ZrO_2)_{0.89}$ |
| Comp. E1-6 | 8.5Sc2.5CeSZ | $(Sc_2O_3)_{0.085}(CeO_2)_{0.025}(ZrO_2)_{0.89}$ |
| Comp. E1-7 | 8Sc3CeSZ | $(Sc_2O_3)_{0.08}(CeO_2)_{0.03}(ZrO_2)_{0.89}$ |

TABLE 2

| Sample | Electrolyte Composition | Chemical Formula |
|---|---|---|
| Comp. E2-1 | 10ScSZ | $(Sc_2O_3)_{0.1}(ZrO_2)_{0.9}$ |
| Comp. E2-2 | 10Sc0.5CeSZ | $(Sc_2O_3)_{0.1}(CeO_2)_{0.005}(ZrO_2)_{0.895}$ |
| Comp. E2-3 | 10Sc1CeSZ | $(Sc_2O_3)_{0.1}(CeO_2)_{0.01}(ZrO_2)_{0.89}$ |
| Comp. E2-4 | 10Sc1.5CeSZ | $(Sc_2O_3)_{0.1}(CeO_2)_{0.015}(ZrO_2)_{0.885}$ |
| Comp. E2-5 | 10Sc2CeSZ | $(Sc_2O_3)_{0.1}(CeO_2)_{0.02}(ZrO_2)_{0.88}$ |
| Comp. E2-6 | 10Sc2.5CeSZ | $(Sc_2O_3)_{0.1}(CeO_2)_{0.025}(ZrO_2)_{0.875}$ |
| Comp. E2-7 | 10Sc3CeSZ | $(Sc_2O_3)_{0.1}(CeO_2)_{0.03}(ZrO_2)_{0.87}$ |

As the starting materials for electrolyte samples, oxides such as $ZrO_2$, $Sc_2O_3$, and $CeO_2$ were used. Specifically, oxide powders were weighed so as to be adapted for the compositions of Tables 1 and 2, and then prepared into a uniform slurry using an ethanol solvent via a ball milling process by means of zirconia ($ZrO_2$) balls. The combined slurry was sufficiently dried in a hot air dryer, dry milled, and underwent uniaxial pressure molding, thus producing molded bodies having a size of 40 mm×40 mm×4 mm (width×length×thickness).

Final electrolyte sintered bodies were manufactured by sintering the electrolyte molded bodies at 1450° C. for 5 hr in air at atmospheric pressure.

In order to analyze the crystal structure of the electrolyte sintered bodies, electrolyte samples having polished surfaces were used, and the electrolyte samples for evaluating ionic conductivity were mechanically processed into conductive samples having a size of 2 mm×2 mm×25 mm (width×length×height).

1-2. Evaluation of Ionic Conductivity

The ionic conductivity of the electrolyte samples was measured using a direct-current four-probe method. Specifically, voltage was measured depending on the applied current, and the cross-sectional area and height of the samples were applied, and thus resistance and conductivity were calculated. This measurement was implemented in air and a hydrogen atmosphere, and the measurement temperature was set to 500~850° C. corresponding to the operating temperature of a SOFC.

Figure 4:
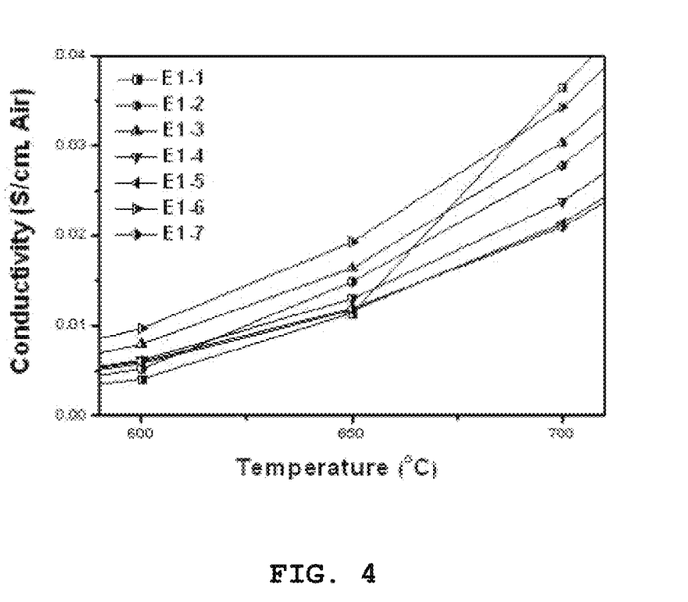
FIG. 4 is a graph illustrating the ionic conductivity of ScSZ electrolytes where a portion of $Sc_2O_3$ is doped with $CeO_2$, as measured in air.

FIG. 4 is a graph illustrating the ionic conductivity of ScSZ electrolytes where a portion of $Sc_2O_3$ is doped with $CeO_2$, as measured in air. In electrolytes of Comparative E1(1~7), the electrolyte of Comparative E1-1 caused phase transition in the temperature range of 650~700° C., thus drastically dropping in ionic conductivity. The electrolyte of Comparative E1-2 dropped in ionic conductivity due to phase transition at relatively low 600~650° C.

Figure 5:
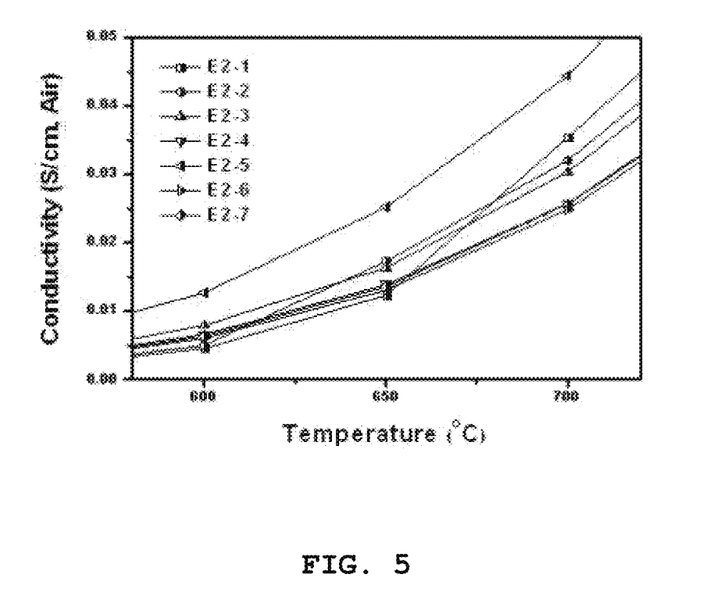
FIG. 5 is a graph illustrating the ionic conductivity of ScSZ electrolytes where a portion of $ZrO_2$ is doped with $CeO_2$, as measured in air.

FIG. 5 is a graph illustrating the ionic conductivity of ScSZ electrolytes where a portion of $ZrO_2$ is doped with $CeO_2$, as measured in air. In electrolytes of Comparative E2(1~7), the electrolyte of Comparative E2-1 caused phase transition at 650-700° C., thus drastically dropping in ionic conductivity, and also, the electrolyte of Comparative E2-2 dropped in ionic conductivity due to phase transition at relatively low 600~650° C., as in the electrolytes of Comparative E1(1~7).

1-3. Comparison of Ionic Conductivity Drop Rate

Figure 6:
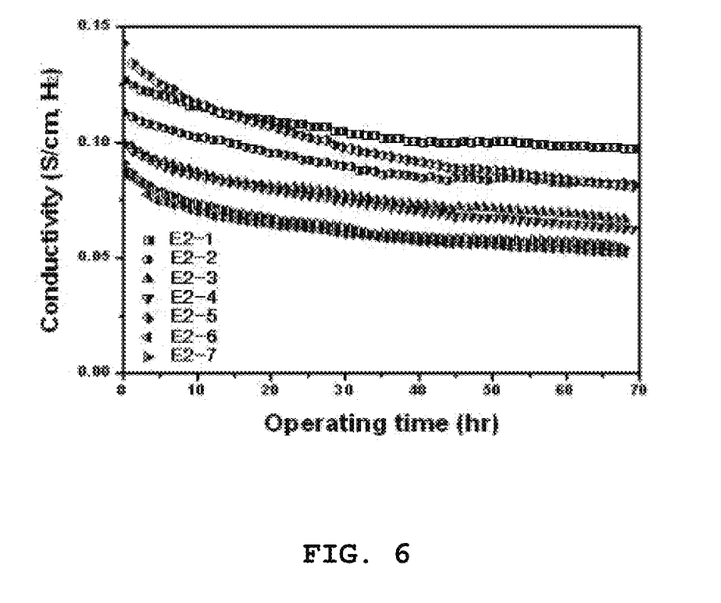
FIG. 6 is a graph illustrating the ionic conductivity of ScSZ electrolytes where a portion of $ZrO_2$ is doped with $CeO_2$, as measured in a hydrogen atmosphere.
Figure 7:
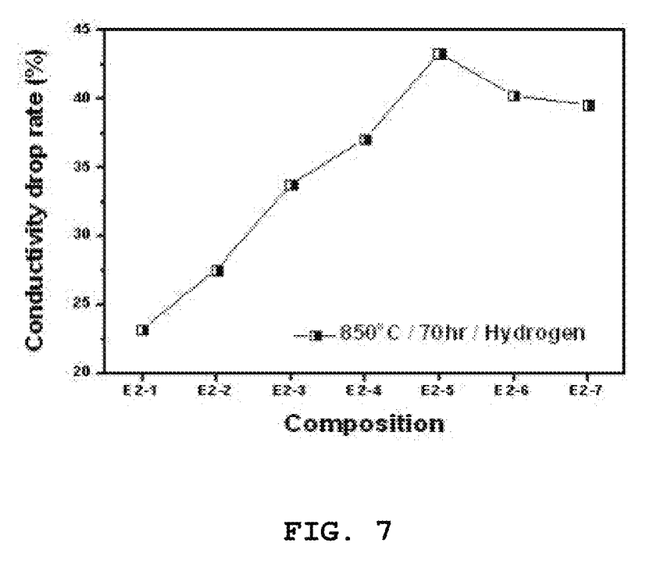
FIG. 7 is a graph illustrating the ionic conductivity drop rate of individual electrolytes based on the results of FIG. 6.

FIG. 6 is a graph illustrating the ionic conductivity of ScSZ electrolytes where a portion of $ZrO_2$ is doped with $CeO_2$, as measured in a hydrogen atmosphere. This graph shows a decrease in the ionic conductivity of the electrolytes of Comparative E2(1~7) with operating time. FIG. 7 is a graph illustrating the ionic conductivity drop rate of individual electrolytes based on the results of FIG. 6. In the ScSZ electrolyte of Comparative E2 where a portion of $ZrO_2$ is doped with $CeO_2$, the ionic conductivity drop rate was drastically increased in proportion to an increase in the amount of $CeO_2$.

TEST EXAMPLE 2

Evaluation of Doping Effect of $Gd_2O_3$, $Sm_2O_3$, $Yb_2O_3$ on 10Sc1CeSZ Electrolyte 2-1. Formation of Electrolyte Samples In order to evaluate the doping effects of novel Re oxide stabilizers on 10Sc1CeSZ electrolytes, electrolyte samples were manufactured in composition designs having the chemical formulas of Tables 3 to 5 below.

TABLE 3

| Sample | Electrolyte Composition | Chemical Formula |
|---|---|---|
| Comp. E3-1 | 10Sc1CeSZ | $(Sc_2O_3)_{0.1}(CeO_2)_{0.01}(ZrO_2)_{0.89}$ |
| Ex. E3-2 | 10Sc0.75Ce0.25GdSZ | $(Sc_2O_3)_{0.1}(CeO_2)_{0.0075}(Gd_2O_3)_{0.0025}(ZrO_2)_{0.89}$ |
| Ex. E3-3 | 10Sc0.5Ce0.5GdSZ | $(Sc_2O_3)_{0.1}(CeO_2)_{0.005}(Gd_2O_3)_{0.005}(ZrO_2)_{0.89}$ |
| Ex. E3-4 | 10Sc0.25Ce0.75GdSZ | $(Sc_2O_3)_{0.1}(CeO_2)_{0.0025}(Gd_2O_3)_{0.0075}(ZrO_2)_{0.89}$ |
| Comp. E3-5 | 10Sc1GdSZ | $(Sc_2O_3)_{0.1}(Gd_2O_3)_{0.01}(ZrO_2)_{0.89}$ |

TABLE 4

| Sample | Electrolyte Composition | Chemical Formula |
| --- | --- | --- |
| Comp. E4-1 | 10Sc1CeSZ | $(Sc_2O_3)_{0.1}(CeO_2)_{0.01}(ZrO_2)_{0.89}$ |
| Ex. E4-2 | 10Sc0.75Ce0.25SmSZ | $(Sc_2O_3)_{0.1}(CeO_2)_{0.0075}(Sm_2O_3)_{0.0025}(ZrO_2)_{0.89}$ |
| Ex. E4-3 | 10Sc0.5Ce0.5SmSZ | $(Sc_2O_3)_{0.1}(CeO_2)_{0.005}(Sm_2O_3)_{0.005}(ZrO_2)_{0.89}$ |
| Ex. E4-4 | 10Sc0.25Ce0.75SmSZ | $(Sc_2O_3)_{0.1}(CeO_2)_{0.0025}(Sm_2O_3)_{0.0075}(ZrO_2)_{0.89}$ |
| Comp. E4-5 | 10Sc1SmSZ | $(Sc_2O_3)_{0.1}(Sm_2O_3)_{0.01}(ZrO_2)_{0.89}$ |

TABLE 5

| Sample | Electrolyte Composition | Chemical Formula |
| --- | --- | --- |
| Comp. E5-1 | 10Sc1CeSZ | $(Sc_2O_3)_{0.1}(CeO_2)_{0.01}(ZrO_2)_{0.89}$ |
| Ex. E5-2 | 10Sc0.75Ce0.25YbSZ | $(Sc_2O_3)_{0.1}(CeO_2)_{0.0075}(Yb_2O_3)_{0.0025}(ZrO_2)_{0.89}$ |
| Ex. E5-3 | 10Sc0.5Ce0.5YbSZ | $(Sc_2O_3)_{0.1}(CeO_2)_{0.005}(Yb_2O_3)_{0.005}(ZrO_2)_{0.89}$ |
| Ex. E5-4 | 10Sc0.25Ce0.75YbSZ | $(Sc_2O_3)_{0.1}(CeO_2)_{0.0025}(Yb_2O_3)_{0.0075}(ZrO_2)_{0.89}$ |
| Comp. E5-5 | 10Sc1YbSZ | $(Sc_2O_3)_{0.1}(Yb_2O_3)_{0.01}(ZrO_2)_{0.89}$ |

In this test example, E3 electrolyte groups where a portion of $CeO_2$ was doped with $Gd_2O_3$ as Re oxide as shown in Table 3, E4 electrolyte groups where a portion of $CeO_2$ was doped with $Sm_2O_3$ as shown in Table 4, and E5 electrolyte groups where a portion of $CeO_2$ was doped with $Yb_2O_3$ as shown in Table 5 were manufactured.

As starting materials for the electrolyte samples, oxides such as $ZrO_2$, $Sc_2O_3$, $CeO_2$, $Gd_2O_3$, $Sm_2O_3$, and $Yb_2O_3$ were used. Specifically, oxide powders were weighed so as to be adapted for the composition designs of the corresponding tables, and then prepared into a uniform slurry using an ethanol solvent via a ball milling process by means of zirconia ($ZrO_2$) balls. The combined slurry was sufficiently dried in a hot air dryer, dry milled, and underwent uniaxial pressure molding, thus producing molded bodies having a size of 40 mm×40 mm×4 mm (width×length×thickness).

Final electrolyte sintered bodies were manufactured by sintering the electrolyte molded bodies at 1450° C. for 5 hr in air at atmospheric pressure.

In order to analyze the crystal structure of the electrolyte sintered bodies, electrolyte samples having polished surfaces were used, and the electrolyte samples for evaluating ionic conductivity were mechanically processed into conductive samples having a size of 2 mm×2 mm×25 mm (width×length×height).

2-2. Evaluation of Crystal Structure

Figure 8:
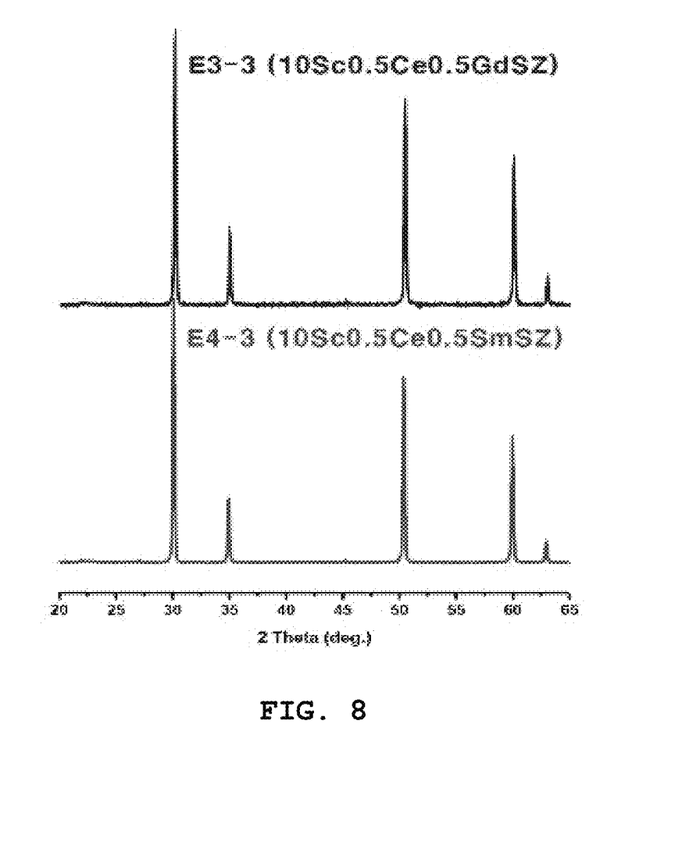
FIG. 8 illustrates the results of analysis of X-ray diffraction (XRD) of a 10Sc0.5Ce0.5GdSZ electrolyte sample and a 10Sc0.5Ce0.5SmSZ electrolyte sample according to an embodiment of the present invention.

FIG. 8 illustrates the results of analysis of XRD of the 10Sc0.5Ce0.5GdSZ electrolyte sample and the 10Sc0.5Ce0.5SmSZ electrolyte sample according to an embodiment of the present invention. Based on the results of XRD analysis of the crystal structure of the 10Sc0.5Gd0.5CeSZ electrolyte sample of Example E3-3 and the 10Sc0.5Sm0.5CeSZ electrolyte sample of Example E4-3 resulting from final sintering treatment, these two electrolyte samples had a cubic structure at room temperature, not a monoclinic structure, and thus were confirmed to be well-stabilized into a desired crystal structure.

Such electrolytes solved the problems with a conventional 11ScSZ electrolyte which is limitedly used attributed to the phase transition and in which a cubic structure is shown at an actual SOFC operating temperature but drastic lattice distortion during phase transition from a monoclinic structure to a cubic structure may have a negative influence on ensuring high-temperature stability of the unit cell.

Therefore, such electrolytes are stabilized into a cubic crystal structure at room temperature and thus may be proper for use in a unit cell for a SOFC, thereby ensuring high-temperature thermomechanical stability of the unit cell.

2-3. Evaluation of Ionic Conductivity

The ionic conductivity of the electrolyte samples was measured using a direct-current four-probe method. Specifically, voltage was measured depending on the applied current, and the cross-sectional area and height of the samples were applied, and thus resistance and conductivity were calculated. This measurement was carried out in an air and hydrogen atmosphere, and the measurement temperature was set to 500~850° C. corresponding to the operating temperature of the SOFC.

Figure 9:
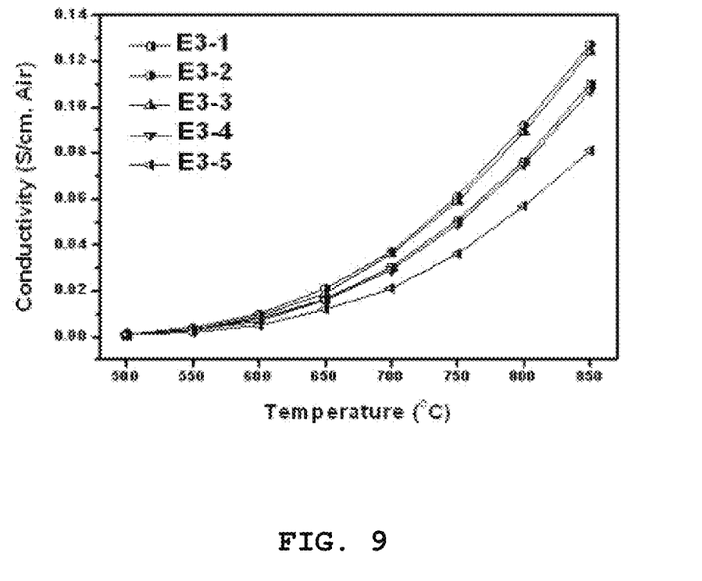
FIG. 9 is a graph illustrating the ionic conductivity in air of 10Sc1CeSZ electrolytes where a portion of $CeO_2$ is doped with $Gd_2O_3$ according to an embodiment of the present invention.

FIG. 9 is a graph illustrating the ionic conductivity of 10Sc1CeSZ electrolytes having partially doped $Gd_2O_3$, as measured in air. Based on the results of measurement of ionic conductivity in air of the electrolytes of E3(1~5) in Test Example 2, the electrolytes of E3-2 and E3-3 exhibited relatively high ionic conductivity at the same temperature compared to the electrolyte of E3-1. Whereas, the electrolytes of E3-4 and E3-5 showed low ionic conductivity compared to the electrolyte of E3-1.

Figure 10:
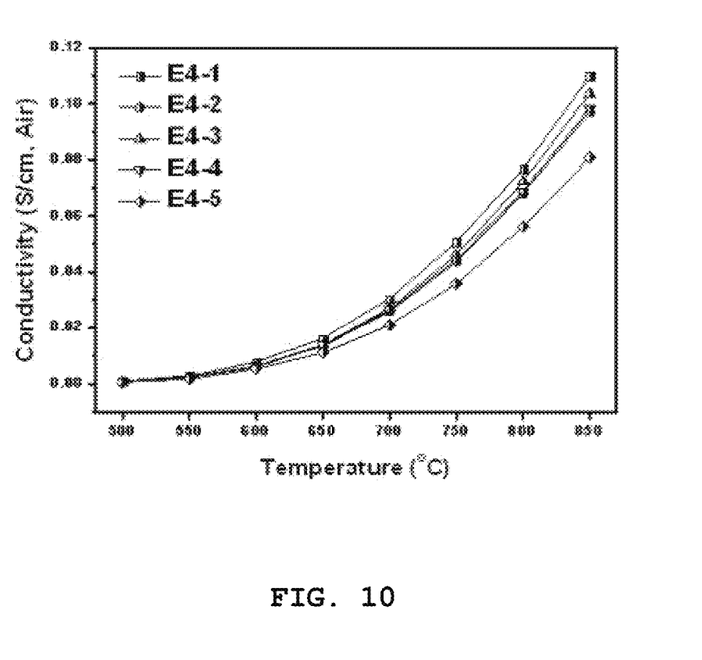
FIG. 10 is a graph illustrating the ionic conductivity in air of 10Sc1CeSZ electrolytes where a portion of $CeO_2$ is doped with $Sm_2O_3$ according to an embodiment of the present invention.

FIG. 10 is a graph illustrating the ionic conductivity of 10Sc1CeSZ electrolytes having partially doped $Sm_2O_3$, as measured in air. Based on the results of measurement of ionic conductivity in air of the electrolytes of E4(1~5) in Test Example 2, all the electrolytes of E4(2~5) exhibited relatively low ionic conductivity at the same temperature compared to the electrolyte of E4-1. In particular, the electrolyte of E4-5 manifested quite low ionic conductivity compared to the electrolytes of E4(2~4).

Figure 11:
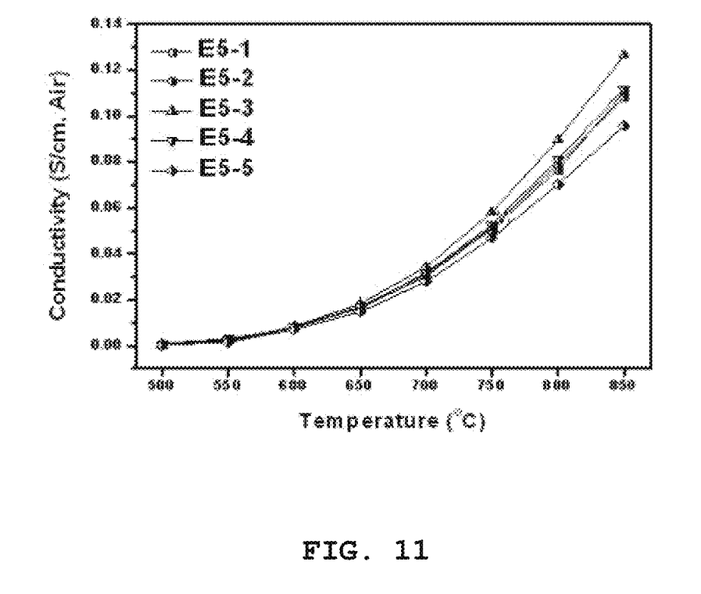
FIG. 11 is a graph illustrating the ionic conductivity in air of 10Sc1CeSZ electrolytes where a portion of $CeO_2$ is doped with $Yb_2O_3$ according to an embodiment of the present invention.

FIG. 11 is a graph illustrating the ionic conductivity of 10Sc1CeSZ electrolytes having partially doped $Yb_2O_3$, as measured in air. Based on the results of measurement of ionic conductivity in air of the electrolytes of E5(1~5) in Test Example 2, the electrolyte of E5-3 exhibited the highest ionic conductivity at the same temperature. Also, the electrolytes of E5-2 and E5-4 showed ionic conductivity similar to that of the electrolyte of E5-1, but the electrolyte of E5-5 manifested comparatively low ionic conductivity.

As is apparent from the results of FIGS. 9 to 11, all the 10Sc1CeSZ electrolytes doped with $Re_2O_3$ manifested high ionic conductivity, compared to comparative 10Sc1ReSZ (E3-5, E4-5, E5-5) electrolytes having no $CeO_2$. Compared to the 8YSZ electrolyte having an ionic conductivity of about 0.04 S/cm at 800° C., all the electrolytes of Examples E3(2~4), E4(2~4), and E5(2~4) showed superior conductivity at least 1.5~2 times at the same temperature.

Especially, the $Gd_2O_3$ doped 10Sc1CeSZ electrolytes (Example E3(2~3)) and the $Yb_2O_3$ doped 10Sc1CeSZ electrolyte (Example E5-3) had superior ionic conductivity, compared to the 10Sc1CeSZ electrolyte. In the other examples, ionic conductivity similar to that of the 10Sc1CeSZ electrolyte was attained.

2-4. Evaluation of Phase Change

Figure 12:
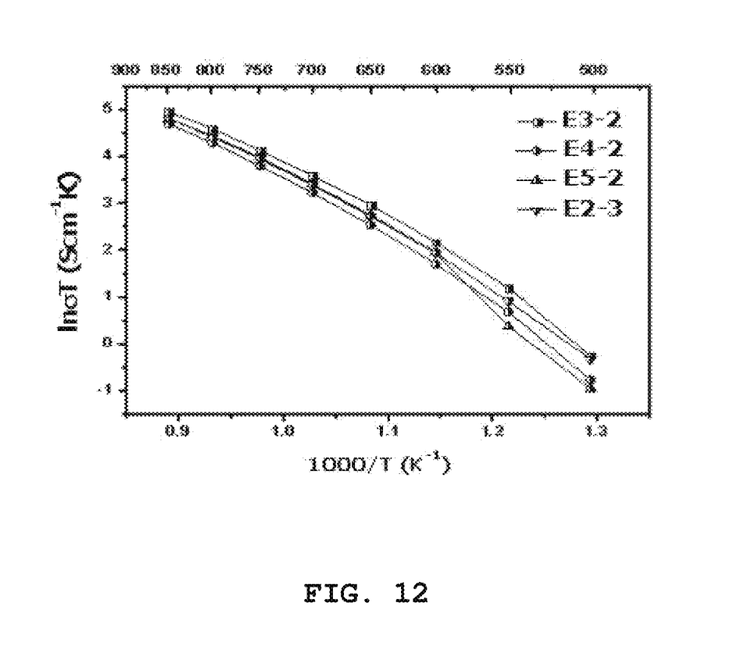
FIG. 12 is a graph illustrating the ionic conductivity of 10Sc0.75Ce0.25GdSZ, 10Sc0.75Ce0.25SmSZ, 10Sc0.75Ce0.25YbSZ and 10Sc1CeSZ electrolytes according to an embodiment of the present invention.
Figure 13:
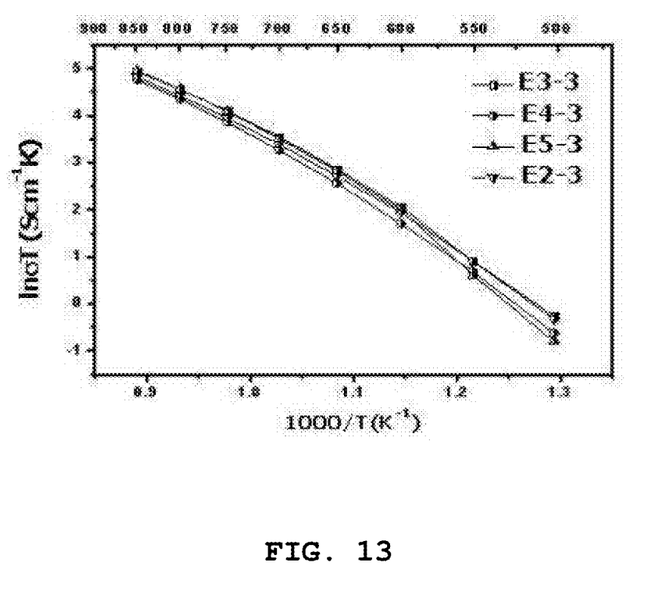
FIG. 13 is a graph illustrating the ionic conductivity of 10Sc0.5Ce0.5GdSZ, 10Sc0.5Ce0.5SmSZ, 10Sc0.5Ce0.5YbSZ and 10Sc1CeSZ electrolytes according to an embodiment of the present invention.
Figure 14:
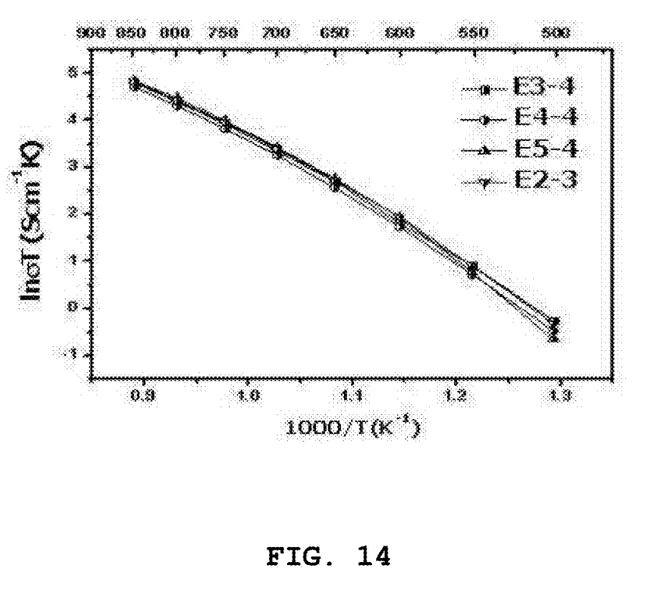
FIG. 14 is a graph illustrating the ionic conductivity of 10Sc0.25Ce0.75GdSZ, 10Sc0.25Ce0.75SmSZ, 10Sc0.25Ce0.75YbSZ and 10Sc1CeSZ electrolytes according to an embodiment of the present invention.

FIGS. 12 to 14 illustrate ionic conductivity in a log scale. If there is no phase change in the electrolyte, the ionic conductivity is represented as a graph close to the straight line as in E2-3 (10Sc1CeSZ). FIGS. 12 to 14 illustrate the results of ionic conductivity of the 10Sc1CeSZ electrolytes doped with $CeO_2$ and $Re_2O_3$ at a molar ratio of 3:1~1:3 and the 10Sc1CeSZ electrolyte.

FIG. 12 illustrates the ionic conductivity of the 10Sc0.75Ce0.25GdSZ, 10Sc0.75Ce0.25SmSZ, 10Sc0.75Ce0.25YbSZ and 10Sc1CeSZ electrolytes according to an embodiment of the present invention. FIG. 13 illustrates the ionic conductivity of the 10Sc0.5Ce0.5GdSZ, 10Sc0.5Ce0.5SmSZ, 10Sc0.5Ce0.5YbSZ and 10Sc1CeSZ electrolytes according to an embodiment of the present invention. FIG. 14 illustrates the ionic conductivity of the 10Sc0.25Ce0.75GdSZ, 10Sc0.25Ce0.75SmSZ, 10Sc0.25Ce0.75YbSZ and 10Sc1CeSZ electrolytes according to an embodiment of the present invention.

The electrolytes of E3-3 and E5-3 show the highest ionic conductivity at the same temperature, and all the electrolytes manifest similar ionic conductivity. In most of the examples, except for the ytterbium oxide ($Yb_2O_3$) doped electrolyte, there is no change in gradient. This means that phase transition does not occur in the electrolytes and thus the ionic conductivity drop rate is mitigated. Phase transition occurred in the ytterbium oxide ($Yb_2O_3$) doped electrolyte (E5-2). However, as the concentration thereof was higher (E5-2, E5-3, E5-4), changes in gradient were decreased.

2-5. Comparison of Ionic Conductivity Drop Rate

Figure 15:
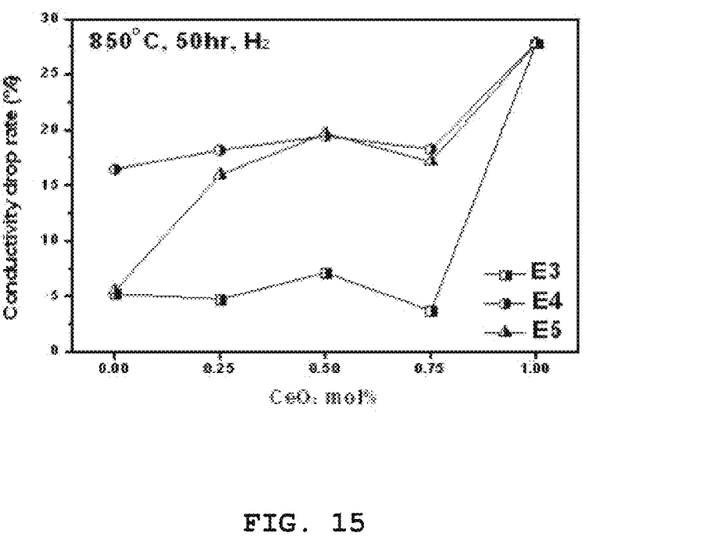
FIG. 15 is a graph illustrating the ionic conductivity drop rate depending on the composition of the ScCeReSZ-based electrolyte according to an embodiment of the present invention.

FIG. 15 is a graph illustrating the ionic conductivity drop rate depending on the composition of the ScCeReSZ-based electrolyte according to an embodiment of the present invention. The electrolytes of E3, E4, and E5 in Test Example 2 were measured for ionic conductivity at 850° C. for 50 hr in a hydrogen atmosphere, and the results of ionic conductivity drop rate depending on the composition of the electrolyte were graphed. The $Gd_2O_3$ doped 10Sc1CeSZ electrolytes of E3(2~5) were regarded as the most stable in a reducing atmosphere.

Furthermore, the $Sm_2O_3$ doped 10Sc1CeSZ electrolyte and the $Yb_2O_3$ doped 10Sc1CeSZ electrolyte were mitigated in ionic conductivity drop rate, compared to the 10Sc1CeSZ electrolyte.

| Sample name | Theoretical density(g/cm³) | Sample density(g/cm³) | Relative density(%) |
|---|---|---|---|
| E3-1 | 5.694 | 5.489 | 96.40 |
| E3-2 | 5.708 | 5.502 | 96.38 |
| E3-3 | 5.722 | 5.568 | 97.31 |
| E3-4 | 5.735 | 5.483 | 95.61 |
| E3-5 | 5.749 | 5.247 | 91.26 |

| Sample name | Theoretical density(g/cm³) | Sample density(g/cm³) | Relative density(%) |
|---|---|---|---|
| E4-1 | 5.694 | 5.489 | 96.40 |
| E4-2 | 5.707 | 5.479 | 96.00 |
| E4-3 | 5.721 | 5.579 | 97.52 |
| E4-4 | 5.733 | 5.447 | 95.01 |
| E4-5 | 5.746 | 5.269 | 91.71 |

| Sample name | Theoretical density(g/cm³) | Sample density(g/cm³) | Relative density(%) |
|---|---|---|---|
| E5-1 | 5.694 | 5.489 | 96.40 |
| E5-2 | 5.710 | 5.476 | 95.90 |
| E5-3 | 5.725 | 5.536 | 96.69 |
| E5-4 | 5.739 | 5.587 | 97.35 |
| E5-5 | 5.754 | 5.049 | 87.74 |

TEST EXAMPLE 3

Evaluation of Characteristics of 10Sc1CeSZ Electrolyte and 10Sc0.5Ce0.5GdSZ Electrolyte The 10Sc1CeSZ electrolyte and the 10Sc0.5Ce0.5GdSZ electrolyte having superior stability in a reducing atmosphere among newly designed electrolytes were synthesized using a coprecipitation process as a commercial synthesis process. Then, a unit cell was manufactured using the synthesized electrolyte powder and the degradation characteristics thereof were evaluated.

3-1. Manufacture of Unit Cell

As starting materials for electrolyte powder, metal chlorides comprising Sc chloride, Gd chloride, Ce chloride, and Zr oxychloride was weighed so as to be adapted for a desired composition, dissolved in pure water, and stirred for 2 hr using a stirrer, giving a uniform solution. The concentration of the aqueous solution was adjusted so that the total metal salt concentration was 0.25 M. As the concentration of the metal salt is lower, the aggregation of a precipitate may decrease, but the yield of a final electrolyte powder may decrease undesirably. Hence, this concentration was appropriately set to about 0.25 M. Although the metal chlorides were used in the test example, a metal nitrate material or a metal oxide dissolved in hydrochloric acid or nitric acid could be utilized. The mixed metal salt was added with ammonium hydroxide as a precipitation reagent at a rate of 250 ml/min, with continuous stirring, until the pH thereof was 10. Then, precipitation was carried out for 5 hr so that metal hydroxide formed by the addition of ammonium hydroxide was sufficiently settled, followed by washing five times with pure water and centrifugation using a centrifuge, thus separating the precipitate. To prevent aggregation of the precipitate, final washing was performed using ethanol. The coprecipitated metal hydroxide was dried at 110° C., and then calcined at 970° C. for 2 hr so that the dried metal hydroxide was crystallized and made into an oxide having a particle size adapted for actual use. The thermally treated electrolyte powder was milled and dispersed for 5 hr in the presence of a pure water solvent using a vertical bead mill with zirconia balls having a diameter of 0.5 mm. The milled slurry was further dried at 110° C., yielding a final electrolyte powder.

The synthesized 10Sc1CeSZ and the 10Sc0.5Ce0.5GdSZ electrolyte powder were subjected to uniaxial pressure molding to produce disk-shaped molded bodies having a diameter of 27 mm, which were then sintered at 1450° C. for 5 hr. The electrolyte sintered bodies were processed to a diameter of 20 mm and a thickness of 300 μm, coated with a cathode (La$_{0.7}$Sr$_{0.3}$MnO$_3$:10Sc1CeSZ=60:40) having a diameter of 8 mm and an anode (NiO:10Sc1CeSZ=57:43) using screen printing, and then thermally treated for 3 hr at 1100° C. and 1250° C., respectively, thus forming porous electrodes. The cathode and the anode were respectively made of LSM (La$_{0.7}$Sr$_{0.3}$Mn$_{1.05}$O$_3$) and NiO in combination with the electrolyte powder.

3-2. Evaluation of Degradation Characteristics of Unit Cell

The completed unit cell was operated at 850° C. for 200 hr using air and hydrogen gas, and the voltage depending on the current density was measured, thus calculating the maximum power density. Also, changes in maximum density depending on the operating time were evaluated.

Figure 16:
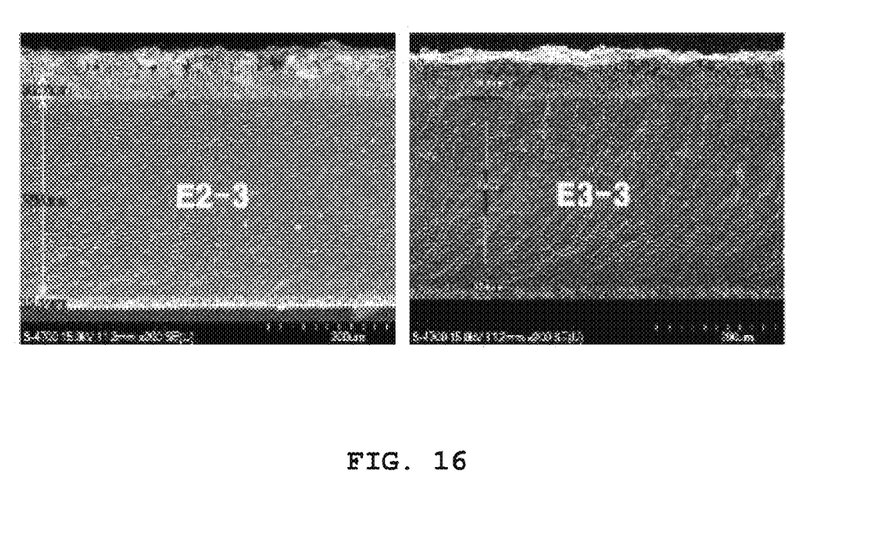
FIG. 16 illustrates the fracture surfaces of unit cells made of the 10Sc0.5Ce0.5GdSZ and the 10Sc1CeSZ electrolyte powder according to an embodiment of the present invention.

FIG. 16 illustrates the fracture surfaces of the unit cells made of the 10Sc0.5Ce0.5GdSZ and the 10Sc1CeSZ electrolyte powder according to an embodiment of the present invention. The unit cells (ESC: electrolyte supported cell) having a diameter of 20 mm and a thickness of 288 μm using the E2-3 10Sc1CeSZ and the E3-3 10Sc0.5Ce0.5GdSZ electrolyte powder of Test Example 3 were manufactured, and the fracture surfaces thereof were compared. Since the power density of a unit cell is related with the ionic conductivity of the electrolyte and also the sintered microstructure and the thickness of the electrolyte, the microstructure of the actually operated cell was evaluated.

Figure 17:
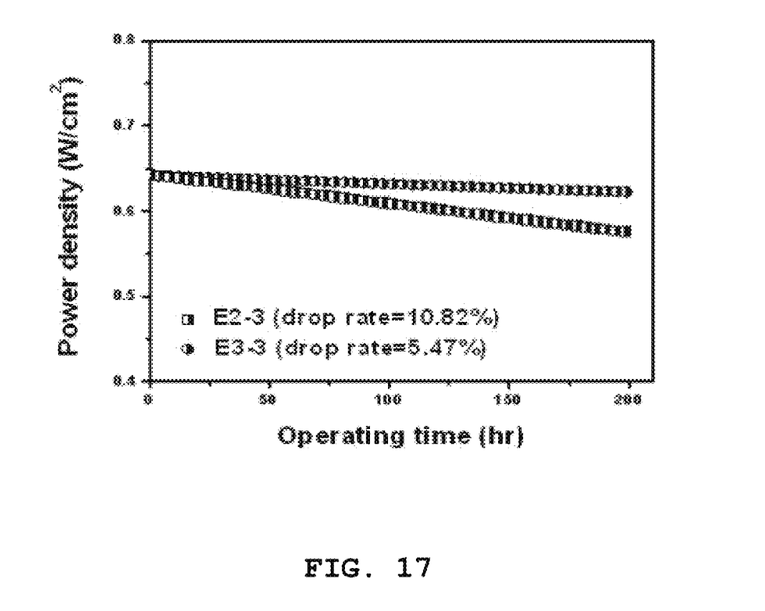
FIG. 17 is a graph illustrating the power density of unit cells made of the 10Sc0.5Ce0.5GdSZ and the 10Sc1CeSZ electrolyte powder according to an embodiment of the present invention, depending on time.
Figure 18:
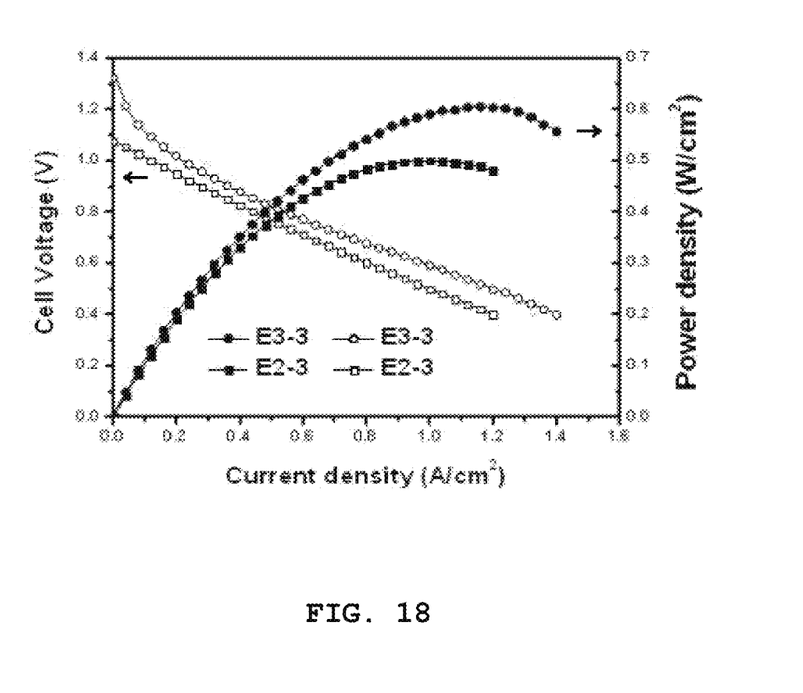
FIG. 18 is a graph illustrating changes in voltage and power density depending on an increase in the current density as measured at 200 hr in the results of FIG. 17.

FIG. 17 is a graph illustrating the power density of the unit cells made of the 10Sc0.5Ce0.5GdSZ and the 10Sc1CeSZ electrolyte powder depending on time, and FIG. 18 is a graph illustrating changes in voltage and power density depending on an increase in the current density as measured at 200 hr in the results of FIG. 17. When the first unit cells having the same power density were operated for 200 hr, the unit cell using the 10Sc0.5Ce0.5GdSZ electrolyte of Example E3-3 exhibited the maximum power density of 0.6 W/cm$^2$, whereas the unit cell using the 10Sc1CeSZ electrolyte of Comparative E2-3 had a relatively low power density of 0.5 W/cm$^2$.

As mentioned above, the Re$_2$O$_3$ doped 10Sc1CeSZ electrolytes exhibited superior ionic conductivity compared to Comparative 10Sc1ReSZ (E3-5, E4-5, E5-5) having no CeO$_2$. In particular, the Gd$_2$O$_3$ doped 10Sc1CeSZ electrolyte (Example E3(2~3)) and the Yb$_2$O$_3$ doped 10Sc1CeSZ electrolyte (Example E5-3) had superior ionic conductivity compared to the 10Sc1CeSZ electrolyte.

Even when having ionic conductivity similar to or lower than that of the 10Sc1CeSZ electrolyte, all the Gd$_2$O$_3$ doped 10Sc1CeSZ, Sm$_2$O$_3$ doped 10Sc1CeSZ, and Yb$_2$O$_3$ doped 10Sc1CeSZ electrolytes were considerably decreased in the ionic conductivity drop rate, thus enabling preparation of the ionic conductive zirconia electrolyte and the unit cell for a high-efficiency SOFC using the same.

As mentioned hereinbefore, the preferred embodiments of the present invention have been disclosed herein and in the drawings, and the specific terms used herein are regarded as easily explaining the technical details of the present invention and aiding understanding of the invention but are not construed to limit the scope of the present invention. Moreover, those skilled in the art will appreciate that various modifications, additions and substitutions are possible, without departing from the scope and spirit of the invention as disclosed in the accompanying claims.

What is claimed is:

1. A highly ionic conductive zirconia electrolyte for a solid oxide fuel cell, comprising:
   a scandia stabilized zirconia electrolyte being simultaneously doped with cerium oxide (CeO$_2$) and gadolinium oxide (Gd$_2$O$_3$) so that an oxygen ionic conductivity drop rate is mitigated, wherein a molar ratio of the CeO$_2$ and Gd$_2$O$_3$ is 1:1~3:1,
   wherein the zirconia electrolyte has a composition of Chemical Formula 1 below:

$$(Sc_2O_3)_x(CeO_2)_y(Gd_2O_3)_z(ZrO_2)_{1-x-y-z} \quad \text{[Chemical Formula 1]}$$

$0.08 \leq x \leq 0.11$
   $0.005 \leq y+z \leq 0.02$.

2. A highly ionic conductive zirconia electrolyte sintered body having a sintering density of 95% or more, obtained by molding and sintering the highly ionic conductive zirconia electrolyte in powder form of claim 1.

3. A unit cell for a solid oxide fuel cell, comprising:
   the highly ionic conductive zirconia electrolyte sintered body of claim 2; and
   a cathode and an anode formed at both sides of the highly ionic conductive zirconia electrolyte sintered body.

4. The unit cell of claim 3, wherein the unit cell has a planer-type, tubular-type, or flat-tube type structure.

5. The unit cell of claim 3, wherein the unit cell is an electrolyte supported cell (ESC), an anode supported cell (ASC), a cathode supported cell (CSC), or a segment-type cell.

6. The unit cell of claim 3, wherein in order to maximize an electrochemical reaction at the cathode, a ceria (CeO$_2$) solid electrolyte in which either Sm or Gd is doped is provided as a dense film or a porous layer between an electrolyte membrane and the cathode, and a powder applied to the cathode includes any one mixed ionic and electronic conductor (MIEC) of Ln$_{1-x}$Sr$_x$Co$_{1-y}$Fe$_y$O$_3$ (Ln is any one selected from among La, Ba, Pr, and Sm, $0.3 \leq x \leq 0.5$, $0.5 \leq y \leq 0.9$), Ln$_{1-x}$Sr$_x$MO$_3$ (Ln is any one selected from among La, Ba, Pr, and Sm, M is any one selected from among Co, Fe, Ni, and Mn, $0.3 \leq x \leq 0.5$), LaNi$_{1-x}$M$_x$O$_3$ (M is any one selected from among Fe and Co, $0.3 \leq x \leq 0.5$), Ln$_{2-x}$Sr$_x$Ni$_{1-y}$M$_y$O$_4$ (Ln is any one selected from among La, Pr, Nd, and Sm, M is any one selected from among Fe, Co, and Mn, $0.2 \leq x \leq 1$, $0.05 \leq y \leq 0.5$), and LnMCo$_2$O$_5$ (Ln is any one selected from among Gd, Sm, and Nd, and M is any one selected from among Ba, Sr, and Ca).

7. The unit cell of claim 3, wherein a powder applied to the cathode is a mixture comprising any one cathode powder of La$_{1-x}$Sr$_x$MO$_3$ ($0.2 \leq x \leq 0.4$, M is any one selected from among Mn, Fe, and Co), Ln$_{1-x}$Sr$_x$Co$_{1-y}$Fe$_y$O$_3$ ($0.2 \leq x \leq 0.5$, $0.2 \leq y \leq 0.8$, Ln is any one selected from among La, Pr, and Ba), and LaNi$_{1-x}$M$_x$O$_3$ ($0.3 \leq x \leq 0.5$, M is any one selected from among Fe, Co, and Cu), and a ScSZ-based electrolyte powder or a Ce$_{1-x}$Ln$_x$O$_2$ ($0.1 \leq x \leq 0.3$, Ln is any one selected from among Gd, Sm, and Y) electrolyte powder.

8. The unit cell of claim 3, wherein a powder applied to the anode comprises a composite of nickel oxide and a ScSZ-based or Ce$_{1-x}$Ln$_x$O$_2$ ($0.1 \leq x \leq 0.3$, Ln is any one selected from among Gd, Sm, and Y) electrolyte powder, which are mixed together, and the nickel oxide is used in an amount of 50~60 wt %.

* * * * *